United States Patent
Jiang et al.

(10) Patent No.: US 12,376,046 B2
(45) Date of Patent: Jul. 29, 2025

(54) POWER CONTROL METHOD AND DEVICE

(71) Applicant: VIVO MOBILE COMMUNICATION CO., LTD., Guangdong (CN)

(72) Inventors: Wei Jiang, Guangdong (CN); Zichao Ji, Guangdong (CN); Huaming Wu, Guangdong (CN); Xiaodong Sun, Guangdong (CN); Shixiao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 668 days.

(21) Appl. No.: 17/584,720

(22) Filed: Jan. 26, 2022

(65) Prior Publication Data
US 2022/0232490 A1    Jul. 21, 2022

Related U.S. Application Data

(63) Continuation of application No. PCT/CN2020/104928, filed on Jul. 27, 2020.

(30) Foreign Application Priority Data

Aug. 9, 2019    (CN) .......................... 201910735992.5

(51) Int. Cl.
*H04W 52/36*    (2009.01)
*H04W 52/24*    (2009.01)

(52) U.S. Cl.
CPC ....... *H04W 52/367* (2013.01); *H04W 52/242* (2013.01)

(58) Field of Classification Search
CPC ......... H04W 52/00–60; H04W 52/242; H04W 52/367
See application file for complete search history.

(56) References Cited

U.S. PATENT DOCUMENTS

| | | | |
|---|---|---|---|
| 9,961,487 | B1 | 5/2018 | Miao |
| 2011/0282175 | A1* | 11/2011 | Geissler ............... A61B 5/0031 600/365 |

(Continued)

FOREIGN PATENT DOCUMENTS

| | | |
|---|---|---|
| CN | 106375930 A | 2/2017 |
| CN | 106465284 A | 2/2017 |

(Continued)

OTHER PUBLICATIONS

Ericsson, Phy layer procedures for sidelink, 3GPP TSG-RAN WG1 Meeting #97, R1-1907143, Reno, US, May 13-17, 2019, 13 pages.

(Continued)

*Primary Examiner* — Raymond S Dean
(74) *Attorney, Agent, or Firm* — Price Heneveld LLP

(57) ABSTRACT

The embodiments of the present disclosure provide a power control method and a device. The method includes: sending a target object by using a target transmit power, where the target object is an object over which power control has been performed, the target transmit power is determined according to a first power and a second power, the first power is a maximum transmit power of the UE, and the second power is a power corresponding to the target object; where the second power includes at least one of the following: a cellular link transmit power and a sidelink transmit power. This method is applied to scenarios in which the UE sends channels, signals, or information.

20 Claims, 3 Drawing Sheets

(56) References Cited

U.S. PATENT DOCUMENTS

| | | | |
|---|---|---|---|
| 2014/0198694 A1 | 7/2014 | Yang et al. | |
| 2015/0156728 A1 | 6/2015 | Kwon et al. | |
| 2015/0201388 A1 | 7/2015 | Cheng et al. | |
| 2015/0271241 A1* | 9/2015 | Sun | H04N 21/43615 709/217 |
| 2015/0327188 A1 | 11/2015 | Bagheri et al. | |
| 2018/0139706 A1* | 5/2018 | Li | H04W 72/542 |
| 2018/0176955 A1* | 6/2018 | Salem | H04W 74/0808 |
| 2019/0289554 A1 | 9/2019 | Li et al. | |
| 2020/0053743 A1* | 2/2020 | Cheng | H04W 4/40 |
| 2020/0296690 A1* | 9/2020 | Lee | H04W 4/40 |

FOREIGN PATENT DOCUMENTS

| | | |
|---|---|---|
| CN | 107018564 A | 8/2017 |
| CN | 108174438 A | 6/2018 |
| CN | 108702244 A | 10/2018 |
| CN | 110062351 A | 7/2019 |
| EP | 3890410 A1 | 6/2021 |
| WO | 2014047940 A1 | 4/2014 |

OTHER PUBLICATIONS

Huawei, Hisilicon, "Sidelink physical layer procedures for NR V2X", 3GPP TSG RAN WG1 Meeting #97, Reno, USA, May 13-17, 2019, 23 pages.

R1-1712520, Intel Corporation, Sidelink Power Control for Wearable and IoT Use Cases, Discussion and Decision, Prague, Czech Republic, Aug. 2017, 5 pages.

\* cited by examiner

POWER CONTROL METHOD AND DEVICE

CROSS-REFERENCE OF RELATED APPLICATION

This application is a continuation application of International Application No. PCT/CN2020/104928 filed on Jul. 27, 2020, which claims priority to Chinese Patent Application No. 201910735992.5, filed with the China National Intellectual Property Administration on Aug. 9, 2019, and entitled "POWER CONTROL METHOD AND DEVICE", which are incorporated herein by reference in their entireties.

TECHNICAL FIELD

Embodiments of the present disclosure relate to the field of communications technologies, and in particular, to a power control method and a device.

BACKGROUND

In the new radio (NR) system, the sidelink (SL) technology can support a transmit-end device to control its transmit power through open loop power control (OLPC). In this way, a receive-end device can receive channels, signals, information, or the like sent by the transmit-end device.

At present, the transmit-end device is, for example, user equipment (UE). The UE can perform open loop power control based on a path loss (hereinafter referred to as path loss 1) between the UE and a base station, or perform open loop power control based on a path loss (hereinafter referred to as path loss 2) between UEs, or perform open loop power control based on path loss 1 and path loss 2. For example, in the unicast transmission mode, the UE can perform open loop power control according to the path loss between the UEs, that is, the path loss 2.

However, in the SL technology, for different channels, signals, or information, which method is specifically used to perform open loop power control is a problem that needs to be solved urgently.

SUMMARY

The embodiments of the present disclosure provide a power control method and a device.

To resolve the foregoing technical problem, the present disclosure is implemented as follows:

According to a first aspect, the embodiments of the present disclosure provide a power control method, which can be applied to UE. The method includes: sending a target object by using a target transmit power, where the target object is an object over which power control has been performed, the target transmit power is determined according to a first power and a second power, the first power is a maximum transmit power of the UE, and the second power is a power corresponding to the target object; where the second power includes at least one of the following: a cellular link transmit power and a sidelink transmit power.

According to a second aspect, the embodiments of the present disclosure provide UE, where the UE includes a sending module. The sending module is configured to send a target object by using a target transmit power, where the target object is an object over which power control has been performed, the target transmit power is determined according to a first power and a second power, the first power is a maximum transmit power of the UE, and the second power is a power corresponding to the target object; where the second power includes at least one of the following: a cellular link transmit power and a sidelink transmit power.

According to a third aspect, the embodiments of the present disclosure provide UE, including: a processor, a memory, and a computer program stored in the memory and executable on the processor, where the computer program, when executed by the processor, implements the steps of the power control method according to the foregoing first aspect.

According to a fourth aspect, the embodiments of the present disclosure provide a computer-readable storage medium, where a computer program is stored in the computer-readable storage medium, and the computer program, when executed by a processor, implements the steps of the power control method according to the foregoing first aspect.

DETAILED DESCRIPTION OF THE EMBODIMENTS

Figure 1:
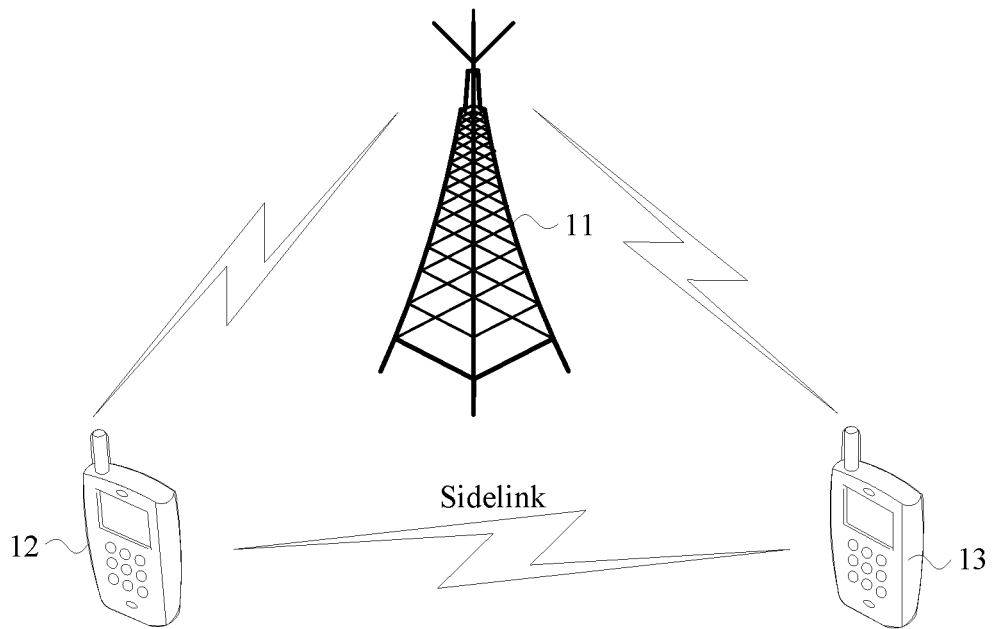
FIG. 1 is a schematic architectural diagram of a communications system according to an embodiment of the present disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure without creative efforts shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, a first power, a second power, and the like are used to distinguish between different powers, and are not used to describe a particular sequence of the powers.

In the embodiments of the present disclosure, the term such as "exemplary" or "for example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

In the description of the embodiments of this disclosure, unless otherwise specified, the meaning of "a plurality of" means two or more. For example, a plurality of elements mean two or more elements.

The embodiments of the present disclosure provide a power control method and a device. The UE may send a target object (an object over which power control has been performed) by using a target transmit power, where the target transmit power is determined according to a first power and a second power, the first power is a maximum transmit power of the UE, and the second power is a power corresponding to the target object; where the second power includes at least one of the following: a cellular link transmit power and a sidelink transmit power. In this solution, the target object to be sent by the UE has a corresponding second power, for example, the second power corresponding to the target object is the cellular link transmit power, or the second power corresponding to the target object includes the cellular link transmit power and the sidelink transmit power. Therefore, the UE can use the power corresponding to the target object to perform open loop power control on the target object actually to be sent by the UE. In this way, for different objects (such as channels, signals, and information), the UE can use the power corresponding to the object to perform open loop power control.

The power control method provided in the embodiments of this disclosure may be applied to a communications system. FIG. 1 is a schematic architectural diagram of a communications system according to an embodiment of the present disclosure. As shown in FIG. 1, the communication system may include: a network device 11 (in FIG. 1, for example, the network device is a base station), first UE 12, and second UE 13 (in FIG. 1, for example, the first UE and the second UE are both mobile phones). The network device 11 may be wirelessly connected to both the first UE 12 and the second UE 13, and a sidelink is established between the first UE 12 and the second UE 13.

Optionally, in the embodiments of the present disclosure, the first UE 12 and the second UE 13 may be wireless UEs. UE is a device providing voice and/or data connectivity to a user, a handheld device having a wired/wireless connection function, or other processing devices connected to a wireless modem. UE may communicate with one or more core network devices through a radio access network (RAN). The UE may be a mobile terminal such as a mobile phone (or referred to as a "cellular" phone) or a computer having a mobile terminal, or may be a portable, pocket-sized, handheld, computer built-in, or vehicle-mounted mobile apparatus, which exchanges voice and/or data with the RAN. For example, the UE is a device such as a personal communication service (PCS) phone, a cordless phone, a session initiation protocol (SIP) phone, a wireless local loop (WLL) station, or a personal digital assistant (PDA). The UE may also be referred to as a user agent (user agent) or the like.

In addition, the network device 11 may be a base transceiver station (BTS) in a global system for mobile communication (GSM) or a code division multiple access (CDMA) network, may be an NB (NodeB) in wideband code division multiple access (WCDMA), or may be an eNB or an eNodeB (evolved NodeB) in LTE. The network device 11 may be alternatively a wireless controller in a cloud radio access network (CRAN) scenario. The network device 11 may be alternatively a base station (gNB) in the 5G communications system or a network side device in a future evolved network.

In the embodiments of the present disclosure, the network device is a device that is disposed in the RAN and that is configured to provide a wireless communication function for the UE. The network device 11 may be a base station, a core network device, a transmission and reception point (TRP), a relay station, an access point, or the like. In the embodiments of the present disclosure, FIG. 1 uses an example in which the network device 11 is a base station. A base station may include various forms of macro base stations, micro base stations, relay stations, access points, and the like. In systems using different radio access technologies, names of devices having functions of a base station may vary. For example, in a 5G system, the device may be called a 5G gNodeB (gNB). In a fourth-generation wireless communication (4-Generation, 4G) system, such as a long term evolution (LTE) system, the device may be called an evolved NodeB (Evolved NodeB, eNB). In a third-generation mobile communication (3G) system, the device may be called a NodeB (NodeB). With evolution of the communications technologies, the name of the "base station" may change.

It should be noted that the communication system shown in FIG. 1 is only a schematic diagram of a possible architecture of the communication system provided by the embodiments of the present disclosure, and the embodiments of the present disclosure are not limited thereto. The communication system involved in the embodiment of the present disclosure may also be other systems, for example, only the first UE 12 and the second UE 13 are included, a sidelink is established between the first UE 12 and the second UE 13, and the network device 11 is not included.

The power control method provided in the embodiments of the present disclosure may be performed by the foregoing transmit-end device that communicates on a sidelink, or may be performed by a functional module and/or a functional entity that may implement the power control method in the transmit-end device that communicates on a sidelink. This may be specifically determined according to an actual use requirement and is not limited in the embodiments of the present disclosure.

In the embodiments of the present disclosure, in the communication system, before the UE sends an object (such as channels, signals, or information), the UE may perform power control (specifically, open loop power control) on the object to be sent by the UE, and send the object by using a transmit power determined by the UE through the power control, so that a receive-end device (for example, receive-end UE) may receive the object sent by the UE. Specifically, the UE may determine, according to a cellular link transmit power, a sidelink transmit power, and a maximum transmit power of the UE, a power used by the UE to send an object, so that the UE uses the appropriate power to send the object.

The following provides exemplary description of the power control method provided in the embodiments of the present disclosure with reference to accompanying drawings.

Figure 2:
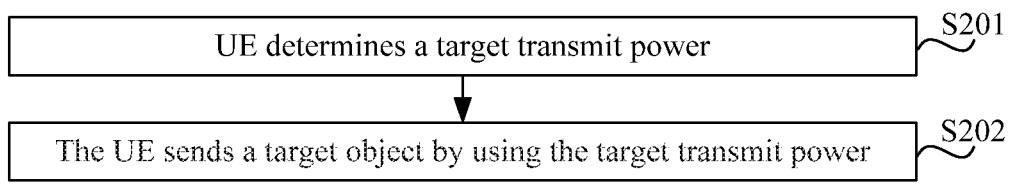
FIG. 2 is a first schematic diagram of a power control method according to an embodiment of the present disclosure.

As shown in FIG. 2, an embodiment of the present disclosure provides a power control method, which may be applied to the communication system shown in FIG. 1. The method may include the following S201 and S202.

S201: UE determines a target transmit power.

S202: The UE sends a target object by using the target transmit power.

The target object may be an object over which power control has been performed, the target transmit power may be determined according to a first power and a second power, the first power may be a maximum transmit power of the UE, and the second power may be a power corresponding to the target object; where the second power includes at least one of the following: a cellular link transmit power and a sidelink transmit power.

In the embodiments of the present disclosure, before the UE sends the target object, the UE may first determine, through open loop power control according to the object to be sent by the UE, the power (that is, the target transmit power) used by the UE to send the target object. Then, after determining the target transmit power, the UE may send the target object by using the target transmit power.

Figure 3:
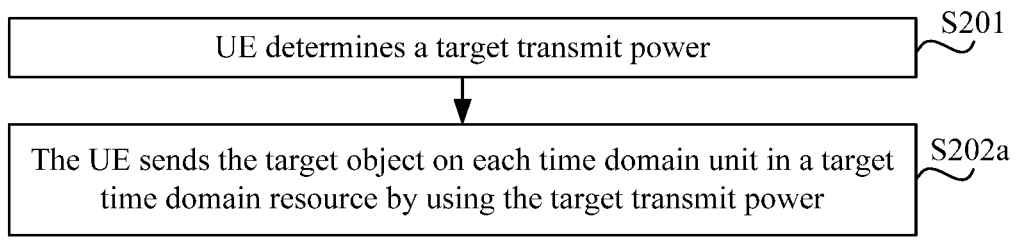
FIG. 3 is a second schematic diagram of a power control method according to an embodiment of the present disclosure.

Optionally, with reference to FIG. 2, as shown in FIG. 3, S202 may be specifically implemented by using the following S202a.

S202a: The UE sends the target object on each time domain unit in a target time domain resource by using the target transmit power.

The target time domain resource may be used to send the target object, and the target time domain resource may be a time domain resource indicated to the UE by the network device.

Optionally, in the embodiments of the present disclosure, the target time domain resource may be at least one time slot, and each time domain unit in the target time domain resource may be a symbol.

Certainly, in actual implementation, the granularity of the target time domain resource and the granularity of each time domain unit in the target time domain resource may also be any other possible time domain granularities, which may be specifically determined according to actual usage requirements and is not limited in the embodiments of the present disclosure.

In the embodiments of the present disclosure, when the UE sends the target object on each time domain unit in the target time domain resource by using the target transmit power, on time domain units in the target time domain resource used to send the target object, powers used to send the target object through the sidelink technology are the same, so that the requirement of sending the target object in the NR system may be satisfied.

Optionally, in the embodiments of the present disclosure, the target object may include at least one of the following: a channel, a reference signal, and sidelink feedback control information (SFCI).

Certainly, in actual implementation, the target object may also include any other possible objects, which may be specifically determined according to actual use requirements and is not limited in the embodiments of the present disclosure.

It should be noted that, in the embodiments of the present disclosure, when the target object is a channel, that the UE sends the channel may specifically be: the UE sends a signal carried on the channel.

Optionally, in the embodiments of the present disclosure, the channel may be any possible channel such as a sidelink shared channel (which specifically may be a physical sidelink shared channel (PSSCH)) and a sidelink control channel (which specifically may be a physical sidelink control channel (PSCCH)), which may be specifically determined according to actual usage requirements and is not limited in the embodiments of the present disclosure.

Optionally, in the embodiments of the present disclosure, the reference signal may be any possible reference signal such as a channel state information reference signal (CSI-RS), which may be specifically determined according to actual usage requirements and is not limited in the embodiments of the present disclosure.

Optionally, in the embodiments of the present disclosure, the sidelink feedback control information may include any possible information such as a channel quality indicator report (CQI report), a rank indicator report (RI report), and layer-1 reference signal received power (RSRP). This may be specifically determined according to actual usage requirements and is not limited in the embodiments of the present disclosure.

Optionally, in the embodiments of the present disclosure, the UE sends different objects, the second power may be a different power, and the target transmit power may also be a different power.

Specifically, in the embodiments of the present disclosure, the target object, the second power, and the target transmit power may include five cases: case 1, case 2, case 3, case 4, and case 5. The five cases (that is, case 1, case 2, case 3, case 4, and case 5) are illustrated below.

Case 1: The target object may be any one of the following: a sidelink shared channel, a sidelink shared channel and a sidelink control channel, a sidelink shared channel and a first object, and a sidelink shared channel, a sidelink control channel, and a first object. The second power may include the cellular link transmit power and the sidelink transmit power. The target transmit power may be the minimum value of the first power and the second power, that is, the target transmit power may be the minimum value of the maximum transmit power of the UE, the cellular link transmit power, and the sidelink transmit power.

The first object may be a reference signal or sidelink feedback control information.

Optionally, in case 1, the cellular link transmit power and the sidelink transmit power may both be transmit powers corresponding to the sidelink shared channel. The cellular link transmit power may be a transmit power corresponding to the sidelink shared channel on a cellular link (that is, a link between the UE and the network device), and the sidelink transmit power may be a transmit power corresponding to the sidelink shared channel on a sidelink (that is, a link between UE and another UE).

Specifically, the cellular link transmit power (denoted as $P_{UU\_PSSCH}$) may be:

$$P_{UU\_PSSCH} = P_{0\_DL\_PSSCH} + \alpha_{DL\_PSSCH} * PL_{DL} + 10 \log 10(M_{PSSCH}).$$

$P_{0\_DL\_PSSCH}$ is a power value expected by a receive-end device (which may be a network device), $\alpha_{DL\_PSSCH}$ is a path loss compensation factor corresponding to the cellular link, $PL_{DL}$ is a downlink path loss (a path loss of the path loss of the cellular link), and $M_{PSSCH}$ is a bandwidth of the sidelink shared channel. Both $P_{0\_DL\_PSSCH}$ and $\alpha_{DL\_PSSCH}$ may be fixed values configured for the UE, and both are associated with resources (for example, time domain resources) for sending the sidelink shared channel.

The sidelink transmit power (denoted as $P_{SL\_PSSCH}$) may be:

$$P_{SL\_PSSCH} = P_{0\_SL\_PSSCH} + \alpha_{SL\_PSSCH} * PL_{SL} + 10 \log 10(M_{PSSCH}) + \Delta_{TF}.$$

$P_{0\_DL\_PSSCH}$ is a power value expected by a receive-end device (which may be another UE), $\alpha_{SL\_PSSCH}$ is a path loss compensation factor corresponding to the sidelink, $PL_{SL}$ is a sidelink path loss, and $M_{PSSCH}$ is a bandwidth of the sidelink shared channel and is a parameter corresponding to a special scenario. Both $P_{0\_SL\_PSSCH}$ and $\alpha_{SL\_PSSCH}$ may be fixed values configured for the UE, and both are associated with resources (for example, time domain resources) for sending the sidelink shared channel.

It may be understood that $\Delta_{TF}$ only exists in some special scenarios, such as the platoon scenario. That is, if the UE is not in a special scenario (for example, the UE is not in a platoon scenario), the sidelink transmit power may be:

$$P_{SL\_PSSCH} = P_{0\_SL\_PSSCH} + \alpha_{SL\_PSSCH} * PL_{SL} + 10 \log 10(M_{PSSCH}).$$

Optionally, in the embodiments of the present disclosure, the value or the value range of $\Delta_{TF}$ may be related to first information. The first information may include at least one of the following: a modulation and coding scheme (MCS) that may be used by the UE, a group identifier (group ID) of the UE, an interference status, quality of service (QoS), and a transmission mode of the target object (such as a unicast mode or a multicast mode).

Certainly, in actual implementation, the value or the value range of $\Delta_{TF}$ may also be determined according to any other possible information or parameters, which may be specifically determined according to actual usage requirements and is not limited in the embodiments of the present disclosure.

Optionally, in the embodiments of the present disclosure, $\Delta_{TF}$ may be obtained in any one of the following manners: pre-defined in the protocol, pre-configured in the UE, configured by a control node for the UE, and obtained by the UE based on the association between the first information and $\Delta_{TF}$.

Optionally, in the embodiments of the present disclosure, the pre-configuration in the UE may specifically be: the network device indicates $\Delta_{TF}$ to the UE through indication information, or the network device adds $\Delta_{TF}$ to a message or signaling to configure it for the UE.

Exemplarily, the indication information may be downlink control information (DCI) or sidelink control information (SCI); and the signaling may be radio resource control (RRC) signaling.

Optionally, in the embodiments of the present disclosure, the control node may be a network device (such as a base station), a road side unit (RSU), a relay node (which may also be referred to as a relay), or UE used to control other UEs on a sidelink.

Certainly, in actual implementation, the indication information, the signaling, and the control node may also be any other possible information, signaling, and node. This may be specifically determined according to an actual usage requirement and is not limited in the embodiments of the present disclosure.

Optionally, in case 1, the cellular link transmit power and the sidelink transmit power may be specifically determined in two manners: manner 1 and manner 2. The two manners are illustrated below.

Manner 1: the cellular link transmit power is determined according to a first switch parameter (denoted as a), and the sidelink transmit power is determined according to a second switch parameter (denoted as b).

In the embodiments of the present disclosure, in manner 1, the cellular link transmit power may be $a \times P_{UU\_PSSCH}$; and the sidelink transmit power may be $b \times P_{SL\_PSSCH}$.

Optionally, in the embodiments of the present disclosure, both the first switch parameter and the second switch parameter may be related to second information. The second information may include at least one of the following: whether the UE is within the coverage of the network device, an interference status, QoS, and the transmission mode of the target object (for example, a unicast mode or a multicast mode).

Certainly, in actual implementation, the second information may also be determined based on any other possible information, which specifically may be determined based on actual use requirements and is not limited in this embodiments of the present disclosure.

Optionally, in the embodiments of the present disclosure, both the first switch parameter and the second switch parameter may be obtained in any one of the following manners: pre-defined in the protocol, pre-configured in the UE, configured by a control node for the UE, and obtained by the UE based on the association between the second information and the first switch parameter (or the second switch parameter).

It should be noted that, in the embodiments of the present disclosure, for related descriptions of pre-configuration in the UE and the control node, refer to the detailed description of pre-configuration in the UE and the control node in the above embodiments. To avoid repetition, this is not repeated herein.

Exemplarily, when the UE is not within the coverage of the network device (that is, the UE is outside the coverage of the network device), the first switch parameter may be infinite (that is, a=inf), and the second switch parameter may be 1 (that is, b=1).

For another example, when the transmission mode of the target object is the multicast mode, the first switch parameter may be 1 (that is, a=1), and the second switch parameter may be infinite (that is, b=inf).

In the embodiments of the present disclosure, in manner 1, the target transmit power (denoted as $P_x$) may be the minimum value of the maximum transmit power (denoted as $P_{max}$) of the UE, the cellular link transmit power (that is, $a \times P_{UU\_PSSCH}$), and the sidelink transmit power (that is, $b \times P\_SL\_PSSCH$), that is, $P_x$ may be: $P_x = \min\{P_{max}, a \times P_{UU\_PSSCH}, b \times P_{SL\_PSSCH}\}$.

Exemplarily, it is assumed that the maximum transmit power of the UE is 23 decibel-milliwatts (dBm), that is, $P_{max}$=23 dBm, the UE is within the coverage of the network device, configuration information received by the UE from the network device is: open loop power control is performed only based on the sidelink path loss ($PL_{SL}$), and the network device configures the value of $P_{0\_SL\_PSSCH}$ and the value of $\alpha_{SL\_PSSCH}$ for the UE. In this case, the UE may determine, according to the configuration information of the network device, that the first switch parameter is: a=inf, and the second switch parameter is: b=1. In this way, when the UE obtains, through calculation, that the sidelink transmit power ($P_{SL\_PSSCH}$) is $P_{SL\_PSSCH}$=20 dBm according to the sidelink path loss ($PL_{SL}$) and the bandwidth ($M_{PSSCH}$) of the sidelink shared channel, the UE may determine that the target transmit power ($P_x$) is:

$$\begin{aligned} P_X &= \min\{P_{max}, a \times P_{UU\_PSSCH}, b \times P_{SL\_PSSCH}\} \\ &= \min\{23, \inf \times P_{UU\_PSSCH}, 1 \times P_{SL\_PSSCH}\} \\ &= \min\{23, \inf, 20\} \\ &= 20 \end{aligned}$$

Manner 2: the cellular link transmit power may be determined according to a cellular link path loss, and the sidelink transmit power may be determined according to a sidelink path loss.

The cellular link path loss may be determined according to configuration information of a network device or is determined according to whether the UE is within the coverage of the network device; and the sidelink path loss may be determined according to the configuration information of the network device or is determined according to a transmission mode of the target object.

It should be noted that, in the embodiments of the present disclosure, the cellular link path loss and the sidelink path loss may also be determined in any other possible manner, which may be specifically determined according to actual use requirements and is not limited in the embodiments of the present disclosure.

Optionally, in manner 2, when the UE meets a first condition, the UE may set the cellular link path loss (which specifically may be a downlink path loss, that is, $PL_{DL}$) to a special value, or when the UE meets a second condition, the UE may set the sidelink path loss (that is, $PL_{SL}$) to a special value.

Optionally, in the embodiments of the present disclosure, the first condition may be that the configuration information of the network device instructs the UE to only use the sidelink path loss to determine the target transmit power; or the first condition may be that the UE is outside the coverage of the network device (that is, the UE is not within the coverage of the network device).

Optionally, in the embodiments of the present disclosure, the second condition may be that the configuration information of the network device instructs the UE to use only the cellular link path loss to determine the target transmit power; or the second condition may be that the transmission mode of the target object is a multicast mode.

Certainly, in actual implementation, the first condition and the second condition may also be any other possible conditions, which specifically may be determined based on actual use requirements and is not limited in the embodiments of the present disclosure.

It should be noted that in the embodiments of the present disclosure, when the UE does not meet the first condition, the cellular link path loss may be a measured value; when the UE does not meet the second condition, the sidelink path loss may be a measured value.

Optionally, in the embodiments of the present disclosure, the special value may be any possible value, for example, is infinite. This may be specifically determined according to an actual usage requirement and is not limited in the embodiments of the present disclosure.

It should be noted that in the embodiments of the present disclosure, since the cellular link transmit power ($P_{UU\_PSSCH}$) may be: $P_{UU\_PSSCH}=P_{0\_DL\_PSSCH}+\alpha_{DL\_PSSCH}*PL_{DL}+10\log 10(M_{PSSCH})$, when the UE sets the cellular link path loss ($PL_{DL}$) to infinite, the cellular link transmit power is also infinite, that is, $P_{UU\_PSSCH}$=inf. Since the sidelink transmit power ($P_{SL\_PSSCH}$) may be $P_{SL\_PSSCH}=P_{0\_SL\_PSSCH}+\alpha_{SL\_PSSCH}*PL_{SL}+10\log 10(M_{PSSCH})+\Delta_{TF}$, when the UE sets the sidelink path loss ($PL_{SL}$) to infinite, the sidelink transmit power is also infinite, that is, $P_{SL\_PSSCH}$=inf.

In the embodiments of the present disclosure, in manner 2, the target transmit power ($P_x$) may be the minimum value of the maximum transmit power ($P_{max}$) of the UE, the cellular link transmit power (that is, $P_{UU\_PSSCH}$), and the sidelink transmit power (that is, $P_{SL\_PSSCH}$), that is, $P_x$ may be: $P_x=\min\{P_{max}, P_{UU\_PSSCH}, P_{SL\_PSSCH}\}$.

Exemplarily, in the embodiments of the present disclosure, when the UE sets the cellular link path loss ($PL_{DL}$) to infinite, the cellular link transmit power may be infinite ($P_{UU\_PSSCH}$=inf). Therefore, the target transmit power may be $P_x=\min\{P_{max}, P_{SL\_PSSCH}\}$. When the sidelink path loss ($PL_{SL}$) is set to infinite, the sidelink transmit power may be infinite ($P_{SL\_PSSCH}$=inf). Therefore, the target transmit power may be $P_x=\min\{P_{max}, P_{UU\_PSSCH}\}$.

Optionally, in the embodiments of the present disclosure, the target transmit power may also be a power obtained after power boosting is performed on the power obtained by the UE in the manner in case 1.

It should be noted that, in the embodiments of the present disclosure, the power boosting may be the same as or similar to that in the traditional technology, which specifically may be determined based on actual use requirements and is not limited in the embodiments of the present disclosure.

Optionally, in case 1 and case 2, the target object is: a sidelink shared channel and a first object (a reference signal or sidelink feedback control information), and S202 may be specifically implemented through the following S202b.

S202b. The UE sends the sidelink shared channel on each time domain unit in a first time domain resource by using a third power, and sends the first object by using a fourth power.

The first time domain resource is a time domain resource multiplexed by the sidelink shared channel and the first object, the first time domain resource may be a time domain resource in the target time domain resource, and a sum of the third power and the fourth power may be the target transmit power.

It should be noted that, in the embodiments of the present disclosure, unless otherwise specified, the sum of multiple powers (for example, the sum of the third power and the fourth power) refers to the sum of the linear values of the multiple powers.

In addition, when the target object includes multiple types of objects (for example, a sidelink shared channel and a sidelink control channel, or a sidelink shared channel, a sidelink control channel, and a first object), for a transmit power corresponding to each object on time domain resources multiplexed by the multiple types of objects, the embodiments of the present disclosure only use an example in which the target object includes two types of objects (for example, a sidelink shared channel and a sidelink control channel). When the target object includes three types of objects (for example, a sidelink shared channel, a sidelink control channel, and a first object), a corresponding case may be specifically determined according to actual use requirements and is not limited in the embodiments of the present disclosure.

Optionally, in the embodiments of the present disclosure, each time domain unit in the first time domain resource may include at least one resource element (RE).

Optionally, in the embodiments of the present disclosure, the third power and the fourth power may be determined in two implementations: implementation 1 and implementation 2. The two implementations are specifically described below.

Implementation 1: the third power and the fourth power may be determined according to the sidelink shared channel.

Optionally, in the embodiments of the present disclosure, the UE may determine, according to the sidelink shared channel, the power corresponding to the first RE, determine the fourth power, and after determining the fourth power, determine the third power according to the target transmit power and the fourth power.

The first RE is an RE of the first object.

Implementation 2: the third power and the fourth power may be determined according to the target power offset.

The target power offset may be a power offset between an RE of the sidelink shared channel and an RE of the first object.

Optionally, in the embodiments of the present disclosure, the target power offset may be obtained in any one of the following manners: pre-defined in the protocol, pre-configured in the UE, configured by a control node for the UE, and obtained by the UE based on the association between the second information and the target power offset.

Certainly, in actual implementation, the target power offset may also be obtained in any other possible manner, which specifically may be determined based on actual use requirements and is not limited in the embodiments of the present disclosure.

It should be noted that, in the embodiments of the present disclosure, for the relevant description of pre-configuration in the UE, the control node, and the second information, refer to the description of pre-configuration in the UE, the control node, and the second information in the foregoing embodiment. To avoid repetition, detailed description is omitted herein.

Case 2: The target object may be any one of the following: a sidelink shared channel and a sidelink control channel, and a sidelink shared channel, a sidelink control channel, and a first object. The second power may include the cellular link transmit power and the sidelink transmit power. The target transmit power may be the minimum value of the first power and the second power, that is, the target transmit power may be the minimum value of the maximum transmit power of the UE, the cellular link transmit power, and the sidelink transmit power.

The first object may be a reference signal or sidelink feedback control information. The cellular link transmit power is determined according to a cellular link path loss, a bandwidth of the sidelink control channel, and a power boosting amount of the sidelink control channel, and the sidelink transmit power is determined according to a sidelink path loss, a bandwidth of the sidelink control channel, and a power boosting amount of the sidelink control channel.

In case 2, the cellular link transmit power and the sidelink transmit power may both be transmit powers corresponding to the sidelink control channel. The cellular link transmit power may be a transmit power corresponding to the sidelink control channel on a cellular link, and the sidelink transmit power may be a transmit power corresponding to the sidelink control channel on a sidelink.

Specifically, the cellular link transmit power (denoted as $P_{UU\_PSCCH}$) may be:

$$P_{UU\_PSCCH} = P_{0\_DL\_PSCCH} + \alpha_{DL\_PSCCH} * PL_{DL} + 10\log 10\left(10^{\frac{X}{10}} M_{PSCCH}\right).$$

$P_{0\_DL\_PSCCH}$ is a power value expected by a receive-end device (which may be a network device), $\alpha_{DL\_PSCCH}$ is a path loss compensation factor corresponding to the cellular link, $PL_{DL}$ is a downlink path loss (a path loss of the path loss of the cellular link), $M_{PSCCH}$ is a bandwidth of the sidelink control channel, X is a power boosting amount of the sidelink control channel, and the unit of X is decibel (dB). Both $P_{0\_DL\_PSCCH}$ and $\alpha_{DL\_PSCCH}$ may be fixed values configured for the UE, and both are associated with resources (for example, time domain resources) for sending the sidelink control channel.

The sidelink transmit power (denoted as $P_{SL\_PSCCH}$) may be:

$$P_{SL\_PSCCH} = P_{0\_SL\_PSCCH} + \alpha_{SL\_PSCCH} * PL_{SL} + 10\log 10\left(10^{\frac{X}{10}} M_{PSCCH}\right).$$

$P_{0\_SL\_PSCCH}$ is a power value expected by a receive-end device (which may be another UE), $\alpha_{SL\_PSCCH}$ is a path loss compensation factor corresponding to the sidelink, $PL_{SL}$ is a sidelink path loss, $M_{PSCCH}$ is a bandwidth of the sidelink control channel, X is a power boosting amount of the sidelink control channel, and the unit of X is dB. Both $P_{0\_SL\_PSCCH}$ AND $\alpha_{SL\_PSCCH}$ may be fixed values configured for the UE, and both are associated with resources (for example, time domain resources) for sending the sidelink shared channel.

Optionally, in the embodiments of the present disclosure, the power boosting amount (X) of the sidelink control channel may be obtained in any one of the following manners: pre-defined in the protocol, pre-configured in the UE, configured by a control node for the UE, and obtained by the UE based on the association between the second information and the power boosting amount of the sidelink control channel.

It should be noted that, in the embodiments of the present disclosure, for the relevant description of the pre-configuration in the UE, the control node, and the second information, refer to the description of pre-configuration in the UE, the control node, and the second information in the foregoing embodiment. To avoid repetition, detailed description is omitted herein.

In the embodiments of the present disclosure, in case 2, the target transmit power ($P_x$) may be the minimum value of the maximum transmit power ($P_{max}$) of the UE, the cellular link transmit power (that is, $P_{UU\_PSCCH}$), and the sidelink transmit power (that is, $P_{SL\_PSCCH}$), that is, $P_x$ may be: $P_x = \min\{P_{max}, P_{UU\_PSCCH}, P_{SL\_PSCCH}\}$.

Optionally, in case 2, the target object is: a sidelink shared channel and a sidelink control channel, and S202 may be specifically implemented through the following S202c.

S202c: The UE sends the sidelink shared channel on each time domain unit in a fourth time domain resource by using a first target power, and sends the sidelink control channel by using a second target power.

The fourth time domain resource may be a time domain resource multiplexed by the sidelink shared channel and the sidelink control channel, the fourth time domain resource may be a time domain resource in the target time domain resource, and a sum of the first target power and the second target power may be the target transmit power.

Optionally, the first target power (denoted as $P_{pssch}$) may be determined based on a power (hereinafter referred to as a target power 1, denoted as $P_1$) of a time domain subunit that transmits the sidelink shared channel on each time domain unit and the bandwidth of the sidelink shared channel (denoted as $M_{PSSCH}$), that is, $P_{pssch} = P_1 \times M_{PSSCH}$. The bandwidth of the sidelink shared channel may specifically be the bandwidth of the sidelink shared channel on each time domain unit in the fourth time domain resource.

Correspondingly, the first target power (denoted as $P_{pscch}$) may be determined based on a power (hereinafter referred to as a target power 2, denoted as $P_2$) of a time domain subunit that transmits the sidelink control channel on each of the time domain units and the bandwidth of the sidelink control channel (denoted as $M_{PSCCH}$), that is, $P_{pscch} = P_2 \times M_{PSCCH}$. The bandwidth of the sidelink control channel may specifically be the bandwidth of the sidelink control channel on each time domain unit in the fourth time domain resource.

Optionally, in the embodiments of the present disclosure, the target power 1 ($P_1$) and the target power 2 ($P_2$) may be determined based on the bandwidth (denoted as $M_{PSSCH}$) of the sidelink shared channel, the bandwidth (denoted as $M_{PSCCH}$) of the sidelink control channel, and the power difference (that is, the power boosting amount of the sidelink control channel, denoted as X) between the sidelink control channel and the sidelink shared channel.

In the embodiments of the present disclosure, the target power 2 may be the sum of the target power 1 and the power boosting amount of the sidelink control channel, that is, $P_2=P_1+X$. P1 and P2 are both db values.

Specifically, the target power 1 ($P_1$) may be:

$$\frac{\left(10^{\left(\frac{P_1}{10}\right)} \times M_{PSSCH}\right)}{1000} + \frac{\left(10^{\left(\frac{P_1+X}{10}\right)} \times M_{PSCCH}\right)}{1000} = P_X;$$

where $P_x$ is the target transmit power.

Figure 4:
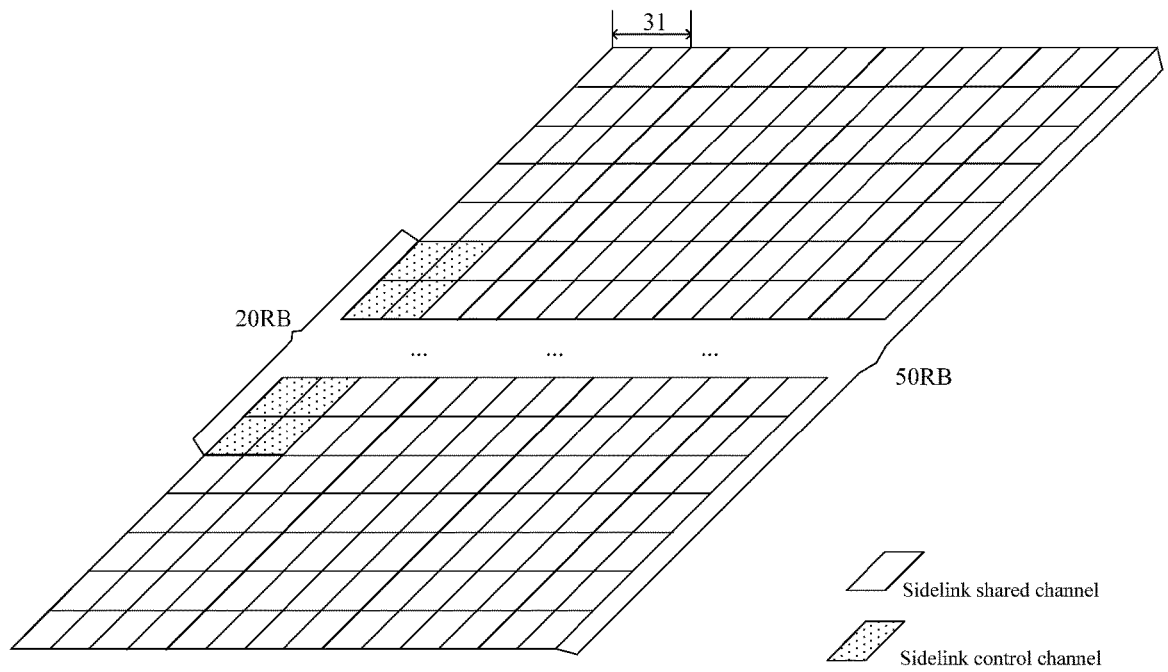
FIG. 4 is a first schematic diagram of multiplexing a time domain resource by target objects according to an embodiment of the present disclosure.

Exemplarily, it is assumed that the linear value of the target transmit power is 0.2 watts (w) (that is, $P_x$=0.2), resources (the fourth time domain resource mentioned above) multiplexed by the sidelink shared channel and the sidelink control channel are the part indicated by 31 shown in FIG. 4, the bandwidth of the sidelink shared channel indicated by 31 is 20 resource blocks (RB), that is, $M_{PSSCH}$=20, the bandwidth of the sidelink control channel is 30 RB, that is, $M_{PSCCH}$=30, and the power difference between the sidelink control channel and the sidelink shared channel is 3 dB (that is, X=3). In this case, the target power 1 (a power used to send the sidelink shared channel on each time domain unit in the fourth time domain resource) may be determined through $$\frac{\left(10^{\left(\frac{P_1}{10}\right)} \times 20\right)}{1000} + \frac{\left(10^{\left(\frac{P_1+3}{10}\right)} \times 30\right)}{1000} = 0.2.$$

Through calculation, it may be known that the target power 1 is 0.0025 W, that is, $P_1$=0.0025 w, and the target power 2 is 0.005 w, that is, $P_2$=0.005 w.

Further, according to $P_{pssch}=P_1 \times M_{PSSCH}$ it may be known that $P_{pssch}$=0.0025×20=0.05 w=16.99 dBm, and according to $P_{pscch}=P_2 \times M_{PSCCH}$, it may be known that $P_{pscch}$=0.005×30=0.15 w=21.76 dBm. In this way, the UE may determine a power used to send the sidelink shared channel and the sidelink control channel on each time domain unit in the fourth time domain resource.

Case 3: The target object may be any one of the following: a sidelink shared channel and a sidelink control channel, and a sidelink shared channel, a sidelink control channel, and a first object. The second power may be the cellular link transmit power or the sidelink transmit power. The target transmit power may be the minimum value of the first power and the second power, that is, the target transmit power may be the minimum value of the maximum transmit power of the UE and the cellular link transmit power, or the minimum value of the maximum transmit power of the UE and the sidelink transmit power.

The first object may be a reference signal or sidelink feedback control information.

Optionally, in case 3, the cellular link transmit power and the sidelink transmit power may both be transmit powers corresponding to the sidelink control channel. The cellular link transmit power may be a transmit power corresponding to the sidelink control channel on a cellular link, and the sidelink transmit power may be a transmit power corresponding to the sidelink control channel on a sidelink.

Optionally, in case 3, when the second power is a different power (the cellular link transmit power or the sidelink transmit power), the second power may be determined in a different manner. Specifically, the second power may be determined in three manners: manner 1, manner 2, and manner 3.

Manner 1: The second power is the cellular link transmit power, and the cellular link transmit power may be determined according to the first switch parameter.

In the embodiments of the present disclosure, in manner 1, the cellular link transmit power may be $a \times P_{UU\_PSCCH}$; where $P_{UU\_PSCCH}$ may be $P_{UU\_PSCCH}=P_{0\_DL\_PSCCH}+\alpha_{DL\_PSCCH}*PL_{DL}+10 \log 10(M_{PSCCH})$.

It should be noted that, in the embodiments of the present disclosure, for related descriptions of the first switch parameter, $P_{0\_DL\_PSCCH}$, $\alpha_{DL\_PSCCH}$ and $PL_{DL}$, refer to the detailed description of the first switch parameter, $P_{0\_DL\_PSCCH}$, $\alpha_{DL\_PSCCH}$, and $PL_{DL}$ in the above embodiments. To avoid repetition, this is not repeated herein.

In the embodiments of the present disclosure, in manner 1, the target transmit power ($P_x$) may be the minimum value of the maximum transmit power ($P_{max}$) of the UE and the cellular link transmit power ($a \times P_{UU\_PSCCH}$), that is, $P_x$ may be: $P_x=\min\{P_{max}, a \times P_{UU\_PSCCH}\}$.

Manner 2: the second power is the cellular link transmit power, and the cellular link transmit power may be determined according to a cellular link path loss, a bandwidth of the sidelink control channel, and a power boosting amount of the sidelink control channel.

In the embodiments of the present disclosure, in manner 2, the cellular link transmit power ($P_{UU\_PSCCH}$) may be:

$$P_{UU\_PSCCH} = P_{0\_DL\_PSCCH} + \alpha_{DL\_PSCCH} * PL_{DL} + 10\log10\left(10^{\frac{X}{10}} M_{PSCCH}\right).$$

It should be noted that, in the embodiments of the present disclosure, for related descriptions of $P_{0\_DL\_PSCCH}$, $\alpha_{DL\_PSCCH}$, $PL_{DL}$, and X, refer to the detailed description of $P_{0\_DL\_PSCCH}$, $\alpha_{DL\_PSCCH}$, $PL_{DL}$, X in the above embodiments. To avoid repetition, this is not repeated herein.

In the embodiments of the present disclosure, in manner 2, the target transmit power ($P_x$) may be the minimum value of the maximum transmit power ($P_{max}$) of the UE and the cellular link transmit power ($P_{UU\_PSCCH}$), that is, $P_x$ may be: $P_x=\min\{P_{max}, P_{UU\_PSCCH}\}$.

Manner 3: the second power is the sidelink transmit power, and the sidelink transmit power may be determined according to a sidelink path loss, a bandwidth of the sidelink control channel, and a power boosting amount of the sidelink control channel.

In the embodiments of the present disclosure, in manner 3, the sidelink transmit power ($P_{SL\_PSCCH}$) may be:

$$P_{SL\_PSCCH} = P_{0\_SL\_PSCCH} + \alpha_{SL\_PSCCH} * PL_{SL} + 10\log10\left(10^{\frac{X}{10}} M_{PSCCH}\right).$$

It should be noted that, in the embodiments of the present disclosure, for related descriptions of $P_{0\_SL\_PSCCH}$, $\alpha_{SL\_PSCCH}$, $PL_{SL}$, and X, refer to the detailed description of $P_{0\_SL\_PSCCH}$, $\alpha_{SL\_PSCCH}$, $PL_{SL}$, and X in the above embodiments. To avoid repetition, this is not repeated herein.

In the embodiments of the present disclosure, in manner 3, the target transmit power ($P_x$) may be the minimum value of the maximum transmit power ($P_{max}$) of the UE and the sidelink transmit power ($P_{SL\_PSCCH}$), that is, $P_x$ may be: $P_x=\min\{P_{max}, P_{SL\_PSCCH}\}$.

Case 4: the target object may be any one of the following: a sidelink shared channel and a reference signal; and a sidelink shared channel, a sidelink control channel, and a reference signal. The second power may include the cellular link transmit power and the sidelink transmit power. The target transmit power may be the minimum value of the first power and the candidate power, that is, the target transmit power is the minimum value of the maximum transmit power of the UE and the candidate power.

The candidate power may be a sum of a fifth power and a reference signal transmit power, the fifth power may be a smaller value of the second power and a sixth power, and the sixth power may be determined according to the first power and the reference signal transmit power.

In the embodiments of the present disclosure, the reference signal transmit power (denoted as $\hat{P}_{RS}$) may be a linear value of a total power corresponding to all reference signals on a time domain unit in the second time domain resource.

The second time domain resource may be a time domain resource multiplexed by a sidelink shared channel and a reference signal.

Optionally, in the embodiments of the present disclosure, the reference signal transmit power ($\hat{P}_{RS}$) may be determined based on the third target power ($\hat{P}_{rs}$), the frequency domain density of the reference signal (that is, the number of REs used to send the reference signal on an RB, denoted as n), and the bandwidth (denoted as $M_{PSSCH}$) of the sidelink shared channel.

The third target power may be the power corresponding to the RE of the reference signal, and the third target power is a linear value.

In the embodiments of the present disclosure, the reference signal transmit power ($\hat{P}_{RS}$) may be: $\hat{P}_{RS}=\hat{P}_{rs}\times n\times M_{PSSCH}$.

Optionally, in the embodiments of the present disclosure, the third target power may be obtained in any one of the following manners: pre-defined in the protocol, pre-configured in the UE, and configured by a control node for the UE.

It should be noted that, in the embodiments of the present disclosure, for related descriptions of pre-configuration in the UE and the control node, refer to the detailed description of pre-configuration in the UE and the control node in the above embodiments. To avoid repetition, this is not repeated herein.

Figure 5:
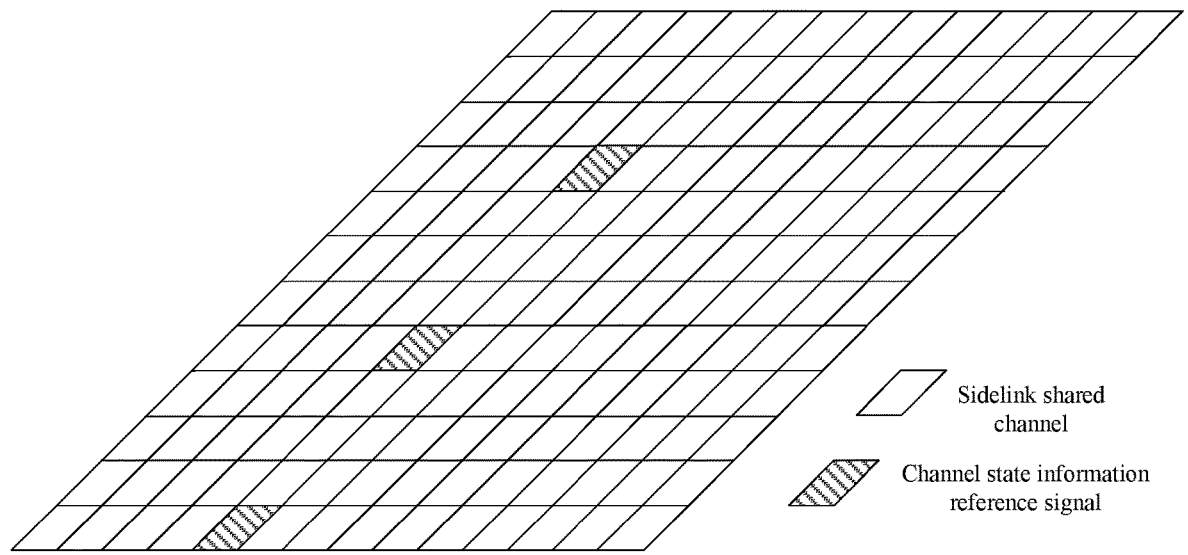
FIG. 5 is a second schematic diagram of multiplexing a time domain resource by target objects according to an embodiment of the present disclosure.

Exemplarily, the reference signal is a channel state information reference signal (CSI-RS). FIG. 5 is a schematic diagram of a time domain unit (for example, one RB). For any RB in the second time domain resource, it is assumed that the frequency domain density of the CSI-RS is 3 (that is, 3 REs on each RB are used for sending a CSI-RS, n=3); the third target power is 0.0004 w ($\hat{P}_{rs}=0.0004$); and the bandwidth of the PSSCH is 50 RB ($M_{PSCCH}=50$). In this case, the reference signal transmit power may be:

$$\hat{P}_{RS}=\hat{P}_{rs}\times n\times M_{PSSCH}32\ 0.0004\times3\times50=0.06\ w.$$

In the embodiments of the present disclosure, the sixth power (denoted as $P_a$) may be determined according to the first power ($P_{max}$) and the reference signal transmit power ($\hat{P}_{RS}$), and may specifically be: $P_a=10\log 10(\hat{P}_{max}-\hat{P}_{RS})$. $\hat{P}_{max}$ is used to represent the linear value of the maximum transmit power of the UE.

In the embodiments of the present disclosure, since the fifth power (denoted as $P_{PSSCH}$) may be the smallest value of the second power (the cellular link transmit power ($P_{UU\_PSSCH}$)), the sidelink transmit power ($P_{SL\_PSSCH}$), and the sixth power ($P_a$), the fifth power is:

$$P_{PSSCH}=\min\{P_a,P_{UU\_PSSCH},P_{SL\_PSSCH}\}=\min\{10\log 10(\hat{P}_{max}-\hat{P}_{RS}),P_{UU\_PSSCH},P_{SL\_PSSCH}\}.$$

The cellular link transmit power may be $P_{UU\_PSSCH}=P_{0\_DL)PSSCH}+\alpha_{DL\_PSSCH}*PL_{DL}+10\log 10(M_{PSSCH})$, and the sidelink transmit power may be $P_{SL\_PSSCH}=P_{0\_SL\_PSSCH}\alpha_{SL\_PSSCH}*PL_{SL}+10\log 10(M_{PSSCH})+\Delta_{TF}$.

Optionally, in case 4, the target object is: a sidelink shared channel and a reference signal, the target transmit power is the candidate power (the sum of the fifth power and the reference signal transmit power), and S202 may be specifically implemented through the following 202d.

S202d: The UE sends the sidelink shared channel on each time domain unit in a second time domain resource by using the fifth power, and sends the reference signal by using the reference signal transmit power.

The second time domain resource may be a time domain resource multiplexed by a sidelink shared channel and a reference signal.

In the embodiments of the present disclosure, for the time domain resource (that is, the second time domain resource) multiplexed by the sidelink shared channel and the reference signal, the UE may send the sidelink shared channel on each time domain unit in the time domain resource by using the fifth power, and send the reference signal by using the reference signal transmit power. In this way, transmit powers corresponding to time domain units in the second time domain resource may be the same (that is, the transmit power corresponding to each time domain unit is the target transmit power mentioned above).

It should be noted that in case 4, when the target object is the sidelink shared channel and the reference signal and the target transmit power is the first power, powers respectively used by the UE to send the sidelink shared channel and the reference signal on the time domain resource multiplexed by the sidelink shared channel and the reference signal may be specifically determined according to actual usage requirements and is not limited in the embodiments of the present disclosure.

Case 5: the target object may be any one of the following: a sidelink shared channel and a sidelink control channel, and a sidelink shared channel, a sidelink control channel, and a first object. The target transmit power may be any one of the following: a sum of a seventh power and an eighth power, or a minimum value, a maximum value, or an average value of a ninth power, the seventh power, and the eighth power.

The first object may be a reference signal or sidelink feedback control information; the seventh power may be the minimum value of the first power and the second power, the second power may include the cellular link transmit power and the sidelink transmit power; the eighth power may be the smaller value of the first power and the second power, the second power may include at least one of the following: the cellular link transmit power and the sidelink transmit power; the ninth power may be the first power, or may be determined based on the seventh power and the eighth power, and the ninth power is less than or equal to the first power.

It may be understood that in case 5, the target transmit power may correspond to three implementations: implementation 1, implementation 2, and implementation 3. The following specifically describes the three implementations.

Implementation 1: the target transmit power is the minimum value, the maximum value, or the average value of the seventh power and the eighth power.

Optionally, in implementation 1, the seventh power may be determined in the manner of determining the target transmit power in case 1, that is, the seventh power is the target transmit power determined in case 1.

It may be understood that, since the second power may include the cellular link transmit power and the sidelink transmit power in case 1, in implementation 1, the second power may also include the cellular link transmit power and the sidelink transmit power.

Optionally, in case 5, the eighth power may be determined in the manner of determining the target transmit power in case 2 or case 3, that is, the eighth power is the target transmit power determined in case 2 or case 3.

It is understandable that in case 2, the second power may include the cellular link transmit power and the sidelink transmit power; in case 3, the second power may be the cellular link transmit power or the sidelink transmit power. Therefore, in implementation 1, the second power may also include at least one of the following: the cellular link transmit power and the sidelink transmit power.

Implementation 2: the target transmit power is the sum of the seventh power and the eighth power.

Optionally, in implementation 2, the seventh power may be determined in the manner of determining the target transmit power in case 1, that is, the seventh power is the target transmit power determined in case 1. The bandwidth of the sidelink shared channel in case 1 may be the bandwidth allocated to the sidelink shared channel on the time domain resource multiplexed by the sidelink shared channel and the sidelink control channel.

Optionally, in case 5, the eighth power may be determined in the manner of determining the target transmit power in case 2 or case 3, that is, the eighth power is the target transmit power determined in case 2 or case 3.

Optionally, in the embodiments of the present disclosure, in implementation 2, the target object is: a sidelink shared channel and a sidelink control channel; and when the sum of the seventh power and the eighth power is less than or equal to the first power, the target transmit power may be the sum of the seventh power and the eighth power. S202 may be specifically implemented through the following S202e.

S202e: The UE sends the sidelink shared channel on each time domain unit in a third time domain resource by using the seventh power, and sends the sidelink control channel by using the eighth power.

The third time domain resource may be a time domain resource multiplexed by the sidelink shared channel and the sidelink control channel.

In the embodiments of the present disclosure, in implementation 2, when the sidelink shared channel and the sidelink control channel multiplex a time domain resource (that is, the third time domain resource), the UE may send the sidelink shared channel on each time domain unit in the third time domain resource by using the seventh power, and send the sidelink control channel by using the eighth power. In this way, transmit powers corresponding to time domain units in the third time domain resource may be the same (that is, the transmit power corresponding to each time domain unit is the target transmit power mentioned above).

Implementation 3: the target transmit power is the ninth power.

It should be noted that in the embodiments of the present disclosure, the seventh power and the eighth power in implementation 3 are the same as the seventh power and the eighth power in implementation 2.

Optionally, in the embodiments of the present disclosure, in implementation 3, the target object is: a sidelink shared channel and a sidelink control channel; and when the sum of the seventh power and the eighth power is greater than the first power, the target transmit power may be the ninth power. S202 may be specifically implemented through the following S202f.

S202f: The UE sends the sidelink shared channel on each time domain unit in a third time domain resource by using a ninth power, and sends the sidelink control channel by using a tenth power.

The third time domain resource may be a time domain resource multiplexed by the sidelink shared channel and the sidelink control channel. The ninth power may be a quotient of the seventh power and a proportional coefficient, the tenth power may be a quotient of the eighth power and a proportional coefficient, and the proportional coefficient may be a ratio of the sum of the seventh power and the eighth power to the first power. Alternatively, the ninth power may be the seventh power, and the tenth power may be a difference between the first power and the ninth power; or the tenth power may be the eighth power, and the ninth power may be a difference between the first power and the tenth power.

It should be noted that, in the embodiments of the present disclosure, the seventh power, the eighth power, the ninth power, and the tenth power are all linear values.

Optionally, in the embodiments of the present disclosure, the ninth power and the tenth power are determined by using two methods: method 1 and method 2. The two methods are specifically described below.

Method 1: when the sum of the seventh power (denoted as $P_3$) and the eighth power (denoted as $P_4$) is greater than the first power ($P_{max}$), the UE may reduce $P_3$ and $P_4$ in equal proportion until the sum of $P_3$ and $P_4$ is less than or equal to $P_{max}$. The reduced $P_3$ is the ninth power, and the reduced $P_4$ is the tenth power.

It should be noted that in method 1, the ninth power may be a quotient of the seventh power and a proportional coefficient, the tenth power may be a quotient of the eighth power and a proportional coefficient, and the proportional coefficient is a ratio of the sum of the seventh power and the eighth power to the first power.

Exemplarily, as shown in FIG. 4, it is assumed that the resource multiplexed the sidelink shared channel and the sidelink control channel is the part indicated by 31 in FIG. 4. For the part indicated by 31 in FIG. 4, the bandwidth of the sidelink shared channel is 20 RB, the bandwidth of the sidelink control channel is 30 RB, and the maximum transmit power of the UE is 23 dBm (that is, the first power, $P_{max}$=23 dBm=0.2 w). In addition, for the part indicated by 31 in FIG. 4, a power (that is, the seventh power) corresponding to the sidelink shared channel is 20 dBm ($P_3$=20 dBm=0.1 w), and a power (that is, the eighth power) corresponding to the sidelink control channel is 21 dBm ($P_4$=21 dBm=0.126 w), that is, the sum ($P_3+P_4$=0.1+0.126=0.226 w) of the seventh power and the eighth power is greater than the first power. In this case, the UE may reduce the seventh power and the eighth power in equal proportion, which may specifically be:

$$\frac{0.226}{0.2} = \frac{0.1}{P_3} \text{ and } \frac{0.226}{0.2} = \frac{0.126}{P_4}.$$

In this way, it may be obtained through calculation that the reduced seventh power (denoted as $P_3'$) is $P_3'=0.0885$ w=19.47 dBm, that is, the ninth power is 19.47 dBm, and the reduced eighth power (denoted as $P_4'$) is $P_4'=0.1115$ w=20.47 dBm, that is, the tenth power is 20.47 dBm.

Method 2: when the sum of the seventh power (denoted as $P_3$) and the eighth power (denoted as $P_4$) is greater than the first power ($P_{max}$), the UE may preferentially allocate a transmit power to a channel with a higher priority in descending order of priorities, until $P_{max}$ is allocated.

It may be understood that, in method 2, whether the ninth power is the seventh power and the tenth power is a difference between the first power and the ninth power; or the tenth power is the eighth power and the ninth power is a difference between the first power and the tenth power may be specifically determined according to the priority of the sidelink shared channel and the priority of the sidelink control channel.

In the embodiments of the present disclosure, when the priority of the sidelink shared channel is higher than the priority of the sidelink control channel, the ninth power may be the seventh power, and the tenth power may be a difference between the first power and the ninth power. When the priority of the sidelink control channel is higher than the priority of the sidelink shared channel, the tenth power may be the eighth power, and the ninth power may be a difference between the first power and the eighth power.

Optionally, in the embodiments of the present disclosure, a priority of the PSCCH is higher than a priority of the PSSCH that only carries data; a priority of the channel that carries an SCI is higher than a priority of the PSSCH that carries data; and a priority of a channel that carries an SCI of stage-1 is higher than a priority of a channel that carries an SCI of stage-2.

Certainly, in actual implementation, a priority of a channel may also include any other possible priority, which may be specifically determined according to actual use requirements and is not limited in the embodiments of the present disclosure.

Exemplarily, as shown in FIG. 4, it is assumed that the resource multiplexed the sidelink shared channel and the sidelink control channel is the part indicated by 31 in FIG. 4. For the part indicated by 31 in FIG. 4, the bandwidth of the sidelink shared channel is 20 RB, the bandwidth of the sidelink control channel is 30 RB, the priority of the sidelink control channel is higher than the priority of the sidelink shared channel, and the maximum transmit power of the UE is 23 dBm (that is, the first power, $P_{max}=23$ dBm=0.2 w). In addition, for the part indicated by 31 in FIG. 4, a power (that is, the seventh power) corresponding to the sidelink shared channel is 20 dBm ($P_3=20$ dBm=0.1 w), and a power (that is, the eighth power) corresponding to the sidelink control channel is 21 dBm ($P_4=21$ dBm=0.126 w), that is, the sum ($P_3+P_4=0.1+0.126=0.226$ w) of the seventh power and the eighth power is greater than the first power. In this case, the UE may preferentially allocate a power to the sidelink control channel, that is, the tenth power may be the eighth power ($P_4=0.126$ w=21 dBm), and then allocate a power to the sidelink shared channel, that is, the ninth power may be the difference between the first power and the tenth power ($P_{max}-P_4=0.2-0.126=0.074$ w=18.7 dBm).

Optionally, in the embodiments of the present disclosure, the target object includes a sidelink shared channel and a sidelink control channel. S202 may be specifically implemented through the following S202g.

S202g: The UE sends a first sidelink shared channel by using a fourth target power, sends a second sidelink shared channel by using a fifth target power, and sends a sidelink control channel by using a sixth target power.

The first sidelink shared channel is a channel that multiplexes a time domain resource with the sidelink control channel among sidelink shared channels, and the second sidelink shared channel is a channel that does not multiplex a time domain resource with the sidelink control channel among sidelink shared channels.

The fourth target power (denoted as $P_{PSSCH1}$) may be determined according to the first transmit power (denoted as $P_{RB}$), the bandwidth (denoted as $M_{PSSCH1}$) of the first sidelink shared channel, and the first parameter (denoted as Y). Specifically, the fourth target power ($P_{PSSCH1}$) may be: $P_{PSSCH1}=P_{RB}+10 \log 10(M_{PSSCH1})+Y$.

The fifth target power (denoted as $P_{PSSCH2}$) may be determined according to the first transmit power (denoted as $P_{RB}$), the bandwidth (denoted as $M_{PSSCH2}$) of the second sidelink shared channel, and the first parameter (denoted as Y). Specifically, the fifth target power ($P_{PSSCH2}$) may be: $P_{PSSCH2}=P_{RB}+10 \log 10(M_{PSSCH2})+Y$.

The sixth target power (denoted as $P_{PSCCH}$) may be determined according to the first transmit power (denoted as $P_{RB}$), the bandwidth (denoted as $M_{PSCCH}$) of the sidelink control channel, and the power boosting amount (X) of the sidelink control channel. Specifically, the sixth target power ($M_{PSCCH}$) may be: $P_{PSCCH}=P_{RB}+10 \log 10(M_{PSSCH})+X$.

Optionally, in the embodiments of the present disclosure, the first transmit power (denoted as $P_{RB}$) may be determined according to a power value ($P_0$) expected by the receive-end device, a path loss compensation factor ($\alpha$), and a path loss (PL). Specifically, the first transmit power ($P_{RB}$) may be: $P_{RB}=P_0+\alpha*PL$.

Optionally, in the embodiments of the present disclosure, the path loss may be a downlink path loss or a sidelink path loss, or may be the maximum or minimum value of the downlink path loss and the sidelink path loss. This may be specifically determined according to an actual usage requirement and is not limited in the embodiments of the present disclosure.

Optionally, in the embodiments of the present disclosure, the first parameter may be determined based on the second parameter (denoted as m), the power boosting amount of the sidelink control channel, the bandwidth of the sidelink shared channel (the bandwidth of the first sidelink shared channel or the bandwidth of the second sidelink shared channel), and the bandwidth of the sidelink control channel. Specifically, the first parameter (Y) may be:

$$Y = 10\log 10\left(1 - m \times \left(10^{\frac{x}{10}} - 1\right) \times \frac{M_{PSCCH}}{M_{PSSCH}}\right).$$

It should be noted that, for the fourth target power, the second parameter may be 0, that is, m=0, and the bandwidth of the sidelink shared channel may be a bandwidth of a first sidelink shared channel (that is, $M_{PSSCH}=M_{PSSCH1}$). For the fifth target power, the second parameter may be 1, that is, m=1, and the bandwidth of the sidelink shared channel may be a bandwidth of a second sidelink shared channel (that is, $M_{PSSCH}=M_{PSSCH2}$).

Certainly, in actual implementation, the UE may also control the transmit power of each target object in any other possible manner, which specifically may be determined based on actual use requirements and is not limited in this embodiment of the present disclosure.

The embodiments of the present disclosure provide a power control method. The target object to be sent by the UE has a corresponding second power, for example, the second power corresponding to the target object is the cellular link transmit power, or the second power corresponding to the target object includes the cellular link transmit power and the sidelink transmit power. Therefore, the UE may use the power corresponding to the target object to perform open loop power control on the target object actually to be sent by the UE. In this way, for different objects (such as channels, signals, and information), the UE may use the power corresponding to the object to perform open loop power control.

It should be noted that in this embodiment of the present disclosure, the power control method shown in each of the foregoing accompanying drawings is described by using an accompanying drawing in this embodiment of the present disclosure as an example. In specific implementation, the power control method shown in each of the accompanying drawings may also be implemented with reference to any other accompanying drawings that may be combined in the above embodiments, which is not repeated herein.

Figure 6:
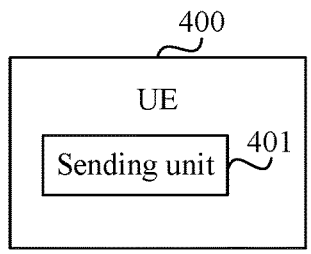
FIG. 6 is a schematic structural diagram of UE according to an embodiment of the present disclosure.

As shown in FIG. 6, an embodiment of the present disclosure provides UE 400. The UE 400 may include a sending module 401. The sending module 401 is configured to send a target object by using a target transmit power. The target object is an object over which power control has been performed, the target transmit power is determined according to a first power and a second power, the first power is a maximum transmit power of the UE, and the second power is a power corresponding to the target object; where the second power includes at least one of the following: a cellular link transmit power and a sidelink transmit power.

Optionally, the target object is any one of the following: a sidelink shared channel, a sidelink shared channel and a sidelink control channel, a sidelink shared channel and a first object, and a sidelink shared channel, a sidelink control channel, and a first object, where the first object is a reference signal or sidelink feedback control information. The second power includes a cellular link transmit power and a sidelink transmit power; and the target transmit power is the smaller value of the first power and the second power.

Optionally, the cellular link transmit power is determined according to a first switch parameter, and the sidelink transmit power is determined according to a second switch parameter; or the cellular link transmit power is determined according to a cellular link path loss, the sidelink transmit power is determined according to a sidelink path loss; the cellular link path loss is determined according to configuration information of a network device or is determined according to whether the UE is within the coverage of the network device; and the sidelink path loss is determined according to the configuration information of the network device or is determined according to a transmission mode of the target object.

Optionally, the target object is any one of the following: a sidelink shared channel and a sidelink control channel, and a sidelink shared channel, a sidelink control channel, and a first object. The cellular link transmit power is determined according to a cellular link path loss, a bandwidth of the sidelink control channel, and a power boosting amount of the sidelink control channel, and the sidelink transmit power is determined according to a sidelink path loss, a bandwidth of the sidelink control channel, and a power boosting amount of the sidelink control channel.

Optionally, the target object is: a sidelink shared channel and a first object. The sending module 401 is specifically configured to send the sidelink shared channel on each time domain unit in a first time domain resource by using a third power, and send the first object by using a fourth power. The first time domain resource is a time domain resource multiplexed by the sidelink shared channel and the first object; and a sum of the third power and the fourth power is the target transmit power.

Optionally, the third power and the fourth power are determined according to the sidelink shared channel, or the third power and the fourth power are determined according to a target power offset, where the target power offset is a power offset between an RE of the sidelink shared channel and an RE of the first object.

Optionally, the target object is any one of the following: a sidelink shared channel and a sidelink control channel, and a sidelink shared channel, a sidelink control channel, and a first object, where the first object is a reference signal or sidelink feedback control information. The second power is a cellular link transmit power or a sidelink transmit power; and the target transmit power is the smaller value of the first power and the second power.

Optionally, the second power is a cellular link transmit power, and the cellular link transmit power is determined according to a first switch parameter, or the cellular link transmit power is determined according to a cellular link path loss, a bandwidth of the sidelink control channel, and a power boosting amount of the sidelink control channel.

Optionally, the second power is a sidelink transmit power, and the sidelink transmit power is determined according to a sidelink path loss, a bandwidth of the sidelink control channel, and a power boosting amount of the sidelink control channel.

Optionally, the target object is any one of the following: a sidelink shared channel and a reference signal, and a sidelink shared channel, a sidelink control channel, and a reference signal. The second power includes a cellular link transmit power and a sidelink transmit power. The target transmit power is a smaller value of the first power and a candidate power, the candidate power is a sum of a fifth power and a reference signal transmit power, the fifth power is a smaller value of the second power and a sixth power, and the sixth power is determined according to the first power and the reference signal transmit power.

Optionally, the target object is: a sidelink shared channel and a reference signal, and the target transmit power is a candidate power. The sending module 401 is specifically configured to send the sidelink shared channel on each time domain unit in a second time domain resource by using the fifth power, and send the reference signal by using the reference signal transmit power, where the second time domain resource is a time domain resource multiplexed by the sidelink shared channel and the reference signal.

Optionally, the target object is any one of the following: a sidelink shared channel and a sidelink control channel, and a sidelink shared channel, a sidelink control channel, and a first object. The target transmit power is any one of the following: a sum of a seventh power and an eighth power, or a minimum value, a maximum value, or an average value of a ninth power, the seventh power, and the eighth power. The first object is a reference signal or sidelink feedback control information; the seventh power is the minimum value of the first power and the second power, the second power includes the cellular link transmit power and the sidelink transmit power; the eighth power is the minimum value of the first power and the second power, the second power includes at least one of the following: the cellular link transmit power and the sidelink transmit power; the ninth power is the first power, or is determined based on the seventh power and the eighth power, and the ninth power is less than or equal to the first power.

Optionally, the target object is: a sidelink shared channel and a sidelink control channel; and when the sum of the seventh power and the eighth power is less than or equal to the first power, the target transmit power is the sum of the seventh power and the eighth power. The sending module 401 is specifically configured to send the sidelink shared channel on each time domain unit in a third time domain resource by using a seventh power, and send the sidelink control channel by using an eighth power, where the third time domain resource is a time domain resource multiplexed by the sidelink shared channel and the sidelink control channel.

Optionally, the target object is: a sidelink shared channel and a sidelink control channel; and when the sum of the seventh power and the eighth power is greater than the first power, the target transmit power is the ninth power. The sending module 401 is specifically configured to send the sidelink shared channel on each time domain unit in a third time domain resource by using a ninth power, and send the sidelink control channel by using a tenth power, where the third time domain resource is a time domain resource multiplexed by the sidelink shared channel and the sidelink control channel. The ninth power is a quotient of the seventh power and a proportional coefficient, the tenth power is a quotient of the eighth power and a proportional coefficient, and the proportional coefficient is a ratio of the sum of the seventh power and the eighth power to the first power. Alternatively, the ninth power is the seventh power and the tenth power is a difference between the first power and the ninth power; or the tenth power is the eighth power and the ninth power is a difference between the first power and the tenth power.

Optionally, the sending module 401 is specifically configured to send the target object on each time domain unit in a target time domain resource by using the target transmit power.

The UE provided in this embodiment of the present disclosure may implement the processes that are implemented by the UE in the foregoing power control method embodiment, and the same technical effects may be achieved. To avoid repetition, details are not described herein again.

An embodiment of the present disclosure further provides UE, where the UE includes a sending module. The sending module is configured to send a target object by using a target transmit power. The target object is an object over which power control has been performed, the target transmit power is determined according to a first power and a second power, the first power is a maximum transmit power of the UE, and the second power is a power corresponding to the target object; where the second power includes at least one of the following: a cellular link transmit power and a sidelink transmit power. In this solution, the target object to be sent by the UE has a corresponding second power, for example, the second power corresponding to the target object is the cellular link transmit power, or the second power corresponding to the target object includes the cellular link transmit power and the sidelink transmit power. Therefore, the UE may use the power corresponding to the target object to perform open loop power control on the target object actually to be sent by the UE. In this way, for different objects (such as channels, signals, and information), the UE may use the power corresponding to the object to perform open loop power control.

Figure 7:
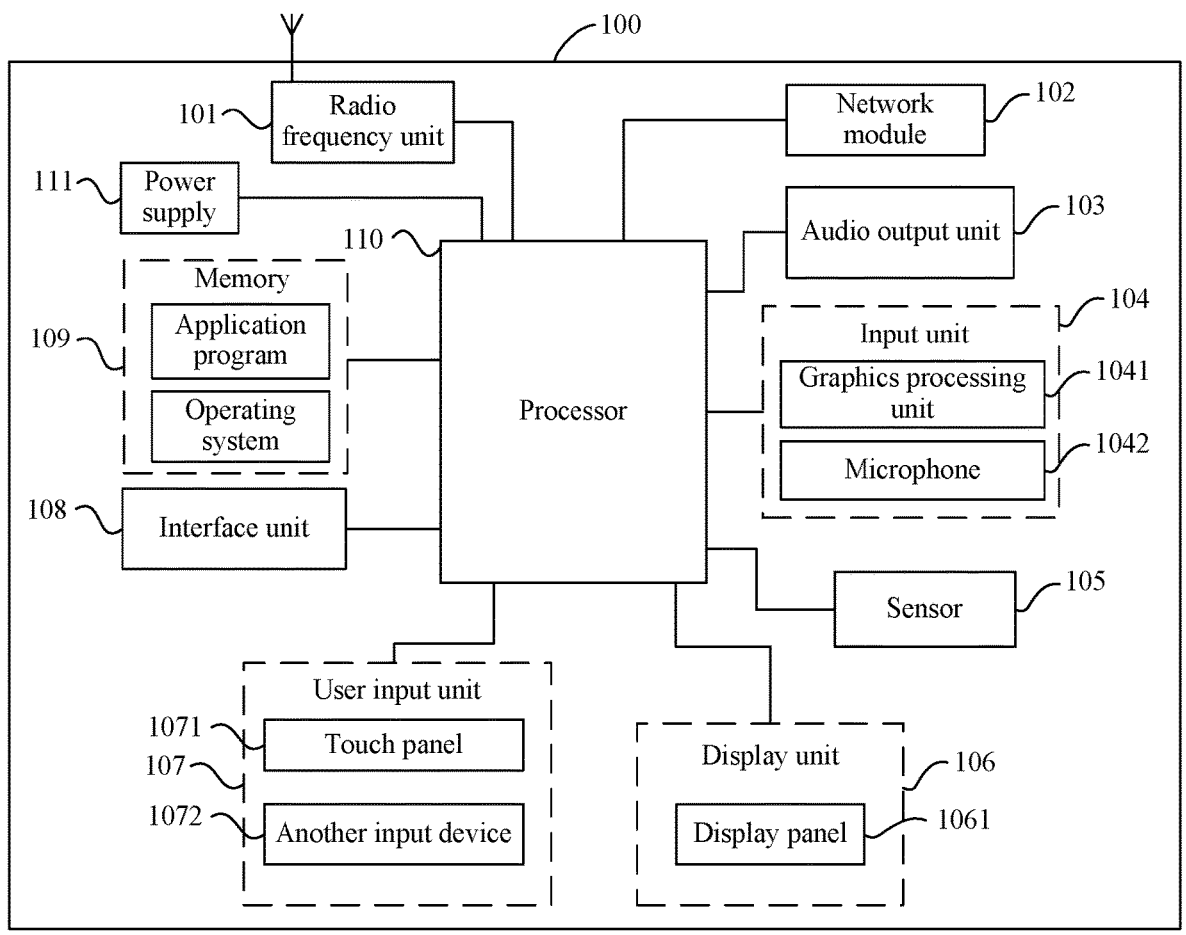
FIG. 7 is a schematic diagram of hardware of UE according to an embodiment of the present disclosure.

FIG. 7 is a schematic diagram of hardware of UE according to the embodiments of the present disclosure. As shown in FIG. 7, UE 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a structure of the UE shown in FIG. 7 does not constitute a limitation on the UE, and the UE may include more or fewer components than those shown in the figure, or some components may be combined, or there may be a different component arrangement. In this embodiment of the present disclosure, the UE includes but is not limited to a mobile phone, a tablet computer, a notebook computer, a palmtop computer, an in-vehicle terminal, a wearable device, a pedometer, and the like.

The radio frequency unit 101 is configured to send a target object by using a target transmit power. The target object is an object over which power control has been performed, the target transmit power is determined according to a first power and a second power, the first power is a maximum transmit power of the UE, and the second power is a power corresponding to the target object; where the second power includes at least one of the following: a cellular link transmit power and a sidelink transmit power.

It may be understood that, in the embodiments of the present disclosure, the sending module 401 in the schematic structural diagram (for example, FIG. 6) of the UE may be specifically implemented by the radio frequency unit 101.

The embodiments of the present disclosure provide UE, and the radio frequency unit in the UE may be configured to send a target object by using a target transmit power. The target object is an object over which power control has been performed, the target transmit power is determined according to a first power and a second power, the first power is a maximum transmit power of the UE, and the second power is a power corresponding to the target object; where the second power includes at least one of the following: a cellular link transmit power and a sidelink transmit power. In this solution, the target object to be sent by the UE has a corresponding second power, for example, the second power corresponding to the target object is the cellular link transmit power, or the second power corresponding to the target object includes the cellular link transmit power and the sidelink transmit power. Therefore, the UE may use the power corresponding to the target object to perform open loop power control on the target object actually to be sent by the UE. In this way, for different objects (such as channels, signals, and information), the UE may use the power corresponding to the object to perform open loop power control.

It should be understood that, in this embodiment of the present disclosure, the radio frequency unit 101 may be configured to receive and transmit information, or receive and transmit signals during a call. Specifically, the radio frequency unit receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another communications device through a wireless communication system and network.

The UE 100 provides the user with wireless broadband Internet access by using the network module 102, for example, helps the user send or receive an email, browse a web page, access streaming media, and the like.

The audio output unit 103 may convert audio data received by the radio frequency unit 101 or the network module 102 or stored in the memory 109 into an audio signal, and output the audio signal as sound. In addition, the audio output unit 103 may further provide an audio output (for example, a call signal received voice, or a message received voice) related to a specific function implemented by the UE 100. The audio output unit 103 includes a speaker, a buzzer, a receiver, and the like.

The input unit 104 is configured to receive audio or video signals. The input unit 104 may include a graphics processing unit (GPU) 1041 and a microphone 1042. The graphics processing unit 1041 processes image data of a static image or a video obtained by an image capturing apparatus (for example, a camera) in a video capturing mode or an image capturing mode. A processed image frame may be displayed on the display unit 106. The image frame processed by the graphics processor 1041 may be stored in the memory 109 (or another storage medium) or sent by using the radio frequency unit 101 or the network module 102. The microphone 1042 may receive sound and may process such sound into audio data. The audio data obtained through processing may be converted, in a telephone call mode, into a format that may be sent to a mobile communications base station via the radio frequency unit 101 for output.

The UE 100 further includes at least one type of sensor 105, such as a light sensor, a motion sensor, and another sensor. Specifically, the light sensor may include an ambient light sensor and a proximity sensor. The ambient light sensor may adjust luminance of the display panel 1061 based on brightness of ambient light. The proximity sensor may turn off the display panel 1061 and/or backlight when the UE 100 moves to an ear. As a type of motion sensor, an accelerometer sensor may detect magnitudes of accelerations in all directions (usually three axes), may detect a magnitude and a direction of gravity in a static state, and may be applied to posture recognition of the UE 100 (such as screen switching between portrait and landscape, related games, and magnetometer posture calibration), functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include a display panel 1061, and the display panel 1061 may be configured in a form of a liquid crystal display (LCD), an organic light-emitting diode (OLED), or the like.

The user input unit 107 may be configured to receive inputted digit or character information and generate key signal input related to user setting and function control of the UE 100. Specifically, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be of a resistive type, a capacitive type, an infrared type, a surface acoustic wave type, or the like. In addition to the touch panel 1071, the user input unit 107 may further include the another input device 1072. Specifically, the another input device 1072 may include, but not limited to, a physical keyboard, a function key (for example, a volume control key or a switch key), a trajectory ball, a mouse, and a joystick. Details are not described herein again.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 7, the touch panel 1071 and the display panel 1061 are used as two independent components to implement input and output functions of the UE 100, in some embodiments, the touch panel 1071 and the display panel 1061 may be integrated to implement the input and output functions of the UE 100. This is not specifically limited herein.

The interface unit 108 is an interface for connecting an external apparatus to the UE 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, an earphone port, and the like. The interface unit 108 may be configured to receive input (for example, data information and power) from the external apparatus and transmit the received input to one or more elements in the UE 100, or may be configured to transmit data between the UE 100 and the external apparatus.

The memory 109 may be configured to store a software program and various data. The memory 109 may mainly include a program storage area and a data storage area. The program storage area may store an operating system, an application (for example, a sound play function or an image play function) required for at least one function, and the like. The data storage area may store data created based on use of the mobile phone (for example, audio data and a phone book), and the like. In addition, the memory 109 may include a high-speed random access memory or a nonvolatile memory, for example, at least one magnetic disk storage device, a flash memory, or another volatile solid-state storage device.

The processor 110 is a control center of the UE 100, connects various parts of the entire UE 100 by using various interfaces and circuits, and performs various functions of the UE 100 and processes data by running or executing software programs and/or modules stored in the memory 109 and invoking data stored in the memory 109, so as to monitor the UE 100 as a whole. The processor 110 may include one or more processing units. Optionally, an application processor and a modem processor may be integrated into the processor 110. The application processor mainly processes an operating system, a user interface, an application program, and the like. The modem processor mainly processes wireless communications. It may be understood that the above-mentioned modem processor may not be integrated in the processor 110.

The terminal 100 may further include the power supply 111 (for example, a battery) configured to supply power to various components. Optionally, the power supply 111 may be logically connected to the processor 110 through a power management system, so as to implement functions such as managing charging, discharging, and power consumption through the power management system.

In addition, the UE 100 includes some function modules not shown, and details are not described herein.

It may be understood that, in the embodiments of the present disclosure, the UE 100 may be the first UE 12 in the communication system shown in FIG. 1 in the foregoing embodiment.

Optionally, an embodiment of the present disclosure further provides UE, including the processor 110 and the memory 109 that are shown in FIG. 7, and a computer program stored in the memory 109 and executable on the processor 110, where the computer program, when executed by the processor 110, implements the processes of the foregoing embodiments of the power control method, and the same technical effects may be achieved. To avoid repetition, details are not described herein again.

An embodiment of the present disclosure further provides a computer-readable storage medium. The computer-readable storage medium stores a computer program. The computer program, when executed by a processor 110 shown in FIG. 7, implements each process of the foregoing embodiment of the power control method performed by the UE, and a same technical effect may be achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A power control method, applied to user equipment (UE), wherein the method comprises:
    sending a target object by using a target transmit power, wherein the target object is an object over which power control has been performed, the target transmit power is a smaller value of a first power and a second power, the first power is a maximum transmit power of the UE, and the second power comprises: a cellular link transmit power and a sidelink transmit power;
    wherein the cellular link transmit power is a transmit power corresponding to the sidelink shared channel on a cellular link, and the sidelink transmit power is a transmit power corresponding to the sidelink shared channel on a sidelink;
    wherein the target object is any one of the following: a sidelink shared channel and a sidelink control channel, a sidelink shared channel and a first object, and a sidelink shared channel, a sidelink control channel, and a first object, wherein the first object is a reference signal or sidelink feedback control information; and
    the cellular link transmit power is further determined according to a cellular link path loss, a bandwidth of the sidelink control channel, and a power boosting amount of the sidelink control channel, and the sidelink transmit power is further determined according to a sidelink path loss, a bandwidth of the sidelink control channel, and a power boosting amount of the sidelink control channel.

2. The method according to claim 1, wherein:
    the cellular link transmit power is determined according to a first switch parameter, and the sidelink transmit power is determined according to a second switch parameter; or
    the cellular link transmit power is determined according to a cellular link path loss, the sidelink transmit power is determined according to a sidelink path loss; the cellular link path loss is determined according to configuration information of a network device or is determined according to whether the UE is within the coverage of the network device; and the sidelink path loss is determined according to the configuration information of the network device or is determined according to a transmission mode of the target object.

3. The method according to claim 1, wherein the target object is: a sidelink shared channel and a first object; and
    the sending a target object by using a target transmit power comprises:
    sending the sidelink shared channel on each time domain unit in a first time domain resource by using a third power, and sending the first object by using a fourth power, wherein the first time domain resource is a time domain resource multiplexed by the sidelink shared channel and the first object;
    wherein a sum of the third power and the fourth power is the target transmit power.

4. The method according to claim 3, wherein the third power and the fourth power are determined according to the sidelink shared channel; or the third power and the fourth power are determined according to a target power offset, wherein the target power offset is a power offset between a resource element RE of the sidelink shared channel and an RE of the first object.

5. The method according to claim 1, wherein the target object is any one of the following: a sidelink shared channel and a reference signal, and a sidelink shared channel, a sidelink control channel, and a reference signal; and wherein the target transmit power is a smaller value of the first power and a candidate power, the candidate power is a sum of a fifth power and a reference signal transmit power, the fifth power is a smaller value of the second power and a sixth power, and the sixth power is determined according to the first power and the reference signal transmit power.

6. The method according to claim 5, wherein the target object is: a sidelink shared channel and a reference signal, and the target transmit power is the candidate power; and the sending a target object by using a target transmit power comprises:

sending the sidelink shared channel on each time domain unit in a second time domain resource by using the fifth power, and sending the reference signal by using the reference signal transmit power, wherein the second time domain resource is a time domain resource multiplexed by the sidelink shared channel and the reference signal.

7. The method according to claim 1, wherein the target object is any one of the following: a sidelink shared channel and a sidelink control channel, and a sidelink shared channel, a sidelink control channel, and a first object, wherein the first object is a reference signal or sidelink feedback control information; and the target transmit power is any one of the following: a sum of a seventh power and an eighth power, or a minimum value, a maximum value, or an average value of a ninth power, the seventh power, and the eighth power;

wherein the seventh power is a smaller value of the first power and the second power;

the eighth power is a smaller value of the first power and the second power, and the second power comprises at least one of the following: a cellular link transmit power and a sidelink transmit power; and the ninth power is the first power or is determined according to the seventh power and the eighth power, wherein the ninth power is less than or equal to the first power.

8. The method according to claim 7, wherein the target object is: a sidelink shared channel and a sidelink control channel; and when the sum of the seventh power and the eighth power is less than or equal to the first power, the target transmit power is the sum of the seventh power and the eighth power; and the sending a target object by using a target transmit power comprises:

sending the sidelink shared channel on each time domain unit in a third time domain resource by using the seventh power, and sending the sidelink control channel by using the eighth power, wherein the third time domain resource is a time domain resource multiplexed by the sidelink shared channel and the sidelink control channel.

9. The method according to claim 7, wherein the target object is: a sidelink shared channel and a sidelink control channel; and when the sum of the seventh power and the eighth power is greater than the first power, the target transmit power is the ninth power; and the sending a target object by using a target transmit power comprises:

sending the sidelink shared channel on each time domain unit in a third time domain resource by using a ninth power, and sending the sidelink control channel by using a tenth power, wherein the third time domain resource is a time domain resource multiplexed by the sidelink shared channel and the sidelink control channel;

wherein the ninth power is a quotient of the seventh power and a proportional coefficient, the tenth power is a quotient of the eighth power and a proportional coefficient, and the proportional coefficient is a ratio of the sum of the seventh power and the eighth power to the first power; or the ninth power is the seventh power, and the tenth power is a difference between the first power and the ninth power; or the tenth power is the eighth power, and the ninth power is a difference between the first power and the tenth power.

10. The method according to claim 1, wherein the sending a target object by using a target transmit power comprises:

sending the target object on each time domain unit in a target time domain resource by using the target transmit power.

11. User equipment (UE), comprising a processor, a memory, and a computer program stored in the memory and executable on the processor, wherein the computer program, when executed by the processor, implements:

sending a target object by using a target transmit power, wherein the target object is an object over which power control has been performed, the target transmit power is a smaller value of a first power and a second power, the first power is a maximum transmit power of the UE, and the second power comprises: a cellular link transmit power and a sidelink transmit power;

wherein the cellular link transmit power is a transmit power corresponding to the sidelink shared channel on a cellular link, and the sidelink transmit power is a transmit power corresponding to the sidelink shared channel on a sidelink;

wherein the target object is any one of the following: a sidelink shared channel and a sidelink control channel, a sidelink shared channel and a first object, and a sidelink shared channel, a sidelink control channel, and a first object, wherein the first object is a reference signal or sidelink feedback control information; and the cellular link transmit power is further determined according to a cellular link path loss, a bandwidth of the sidelink control channel, and a power boosting amount of the sidelink control channel, and the sidelink transmit power is further determined according to a sidelink path loss, a bandwidth of the sidelink control channel, and a power boosting amount of the sidelink control channel.

12. The UE according to claim 11, wherein the target object is any one of the following: a sidelink shared channel and a reference signal, and a sidelink shared channel, a sidelink control channel, and a reference signal;

wherein the candidate power is a sum of a fifth power and a reference signal transmit power, the fifth power is a smaller value of the second power and a sixth power, and the sixth power is determined according to the first power and the reference signal transmit power.

13. A non-transitory computer-readable storage medium, wherein the non-transitory computer-readable storage medium stores a computer program, and the computer program, when executed by a processor, implements:
   sending a target object by using a target transmit power, wherein the target object is an object over which power control has been performed, the target transmit power is a smaller value of a first power and a second power, the first power is a maximum transmit power of the UE, and the second power comprises: a cellular link transmit power and a sidelink transmit power;
   wherein the cellular link transmit power is a transmit power corresponding to the sidelink shared channel on a cellular link, and the sidelink transmit power is a transmit power corresponding to the sidelink shared channel on a sidelink;
   wherein the target object is any one of the following: a sidelink shared channel and a sidelink control channel, a sidelink shared channel and a first object, and a sidelink shared channel, a sidelink control channel, and a first object, wherein the first object is a reference signal or sidelink feedback control information; and
   the cellular link transmit power is further determined according to a cellular link path loss, a bandwidth of the sidelink control channel, and a power boosting amount of the sidelink control channel, and the sidelink transmit power is further determined according to a sidelink path loss, a bandwidth of the sidelink control channel, and a power boosting amount of the sidelink control channel.

14. The non-transitory computer-readable storage medium according to claim 13, wherein:
   the cellular link transmit power is determined according to a first switch parameter, and the sidelink transmit power is determined according to a second switch parameter; or
   the cellular link transmit power is determined according to a cellular link path loss, the sidelink transmit power is determined according to a sidelink path loss; the cellular link path loss is determined according to configuration information of a network device or is determined according to whether the UE is within the coverage of the network device; and the sidelink path loss is determined according to the configuration information of the network device or is determined according to a transmission mode of the target object.

15. The non-transitory computer-readable storage medium according to claim 13, wherein the target object is: a sidelink shared channel and a first object; and
   the sending a target object by using a target transmit power comprises:
   sending the sidelink shared channel on each time domain unit in a first time domain resource by using a third power, and sending the first object by using a fourth power, wherein the first time domain resource is a time domain resource multiplexed by the sidelink shared channel and the first object;
   wherein a sum of the third power and the fourth power is the target transmit power.

16. The UE according to claim 11, wherein the target object is: a sidelink shared channel and a first object; and
   the sending a target object by using a target transmit power comprises:
   sending the sidelink shared channel on each time domain unit in a first time domain resource by using a third power, and sending the first object by using a fourth power, wherein the first time domain resource is a time domain resource multiplexed by the sidelink shared channel and the first object;
   wherein a sum of the third power and the fourth power is the target transmit power.

17. The UE according to claim 11, wherein the target object is any one of the following: a sidelink shared channel and a sidelink control channel, and a sidelink shared channel, a sidelink control channel, and a first object, wherein the first object is a reference signal or sidelink feedback control information; and
   the target transmit power is any one of the following: a sum of a seventh power and an eighth power, or a minimum value, a maximum value, or an average value of a ninth power, the seventh power, and the eighth power;
   wherein the seventh power is a smaller value of the first power and the second power;
   the eighth power is a smaller value of the first power and the second power, and the second power comprises at least one of the following: a cellular link transmit power and a sidelink transmit power; and
   the ninth power is the first power or is determined according to the seventh power and the eighth power, wherein the ninth power is less than or equal to the first power.

18. The UE according to claim 17, wherein the target object is: a sidelink shared channel and a sidelink control channel; and when the sum of the seventh power and the eighth power is less than or equal to the first power, the target transmit power is the sum of the seventh power and the eighth power; and
   the sending a target object by using a target transmit power comprises:
   sending the sidelink shared channel on each time domain unit in a third time domain resource by using the seventh power, and sending the sidelink control channel by using the eighth power, wherein the third time domain resource is a time domain resource multiplexed by the sidelink shared channel and the sidelink control channel.

19. The non-transitory computer-readable storage medium according to claim 13, wherein the target object is any one of the following: a sidelink shared channel and a reference signal, and a sidelink shared channel, a sidelink control channel, and a reference signal;
   wherein the target transmit power is a smaller value of the first power and a candidate power, the candidate power is a sum of a fifth power and a reference signal transmit power, the fifth power is a smaller value of the second power and a sixth power, and the sixth power is determined according to the first power and the reference signal transmit power.

20. The non-transitory computer-readable storage medium according to claim 13, wherein the target object is any one of the following: a sidelink shared channel and a sidelink control channel, and a sidelink shared channel, a sidelink control channel, and a first object, wherein the first object is a reference signal or sidelink feedback control information; and
   the target transmit power is any one of the following: a sum of a seventh power and an eighth power, or a minimum value, a maximum value, or an average value of a ninth power, the seventh power, and the eighth power;

wherein the seventh power is a smaller value of the first power and the second power;

the eighth power is a smaller value of the first power and the second power, and the second power comprises at least one of the following: a cellular link transmit power and a sidelink transmit power; and the ninth power is the first power or is determined according to the seventh power and the eighth power, wherein the ninth power is less than or equal to the first power.

* * * * *